United States Patent Office 3,725,270
Patented Apr. 3, 1973

---

3,725,270
POLLUTION ABATEMENT PROCESS FOR REFINERY WASTE WATER
Joseph P. Tassoney, Whittier, Calif., and Roger M. Dille, Richmond, Va., assignors to Texaco Inc., New York, N.Y.
No Drawing. Filed Feb. 25, 1971, Ser. No. 119,054
Int. Cl. C02c 5/04
U.S. Cl. 210—63    9 Claims

ABSTRACT OF THE DISCLOSURE

This process pertains to the abatement of pollution from sulfide-bearing waste waters. Waste aqueous solutions e.g., sour water, treated sour water, and other refinery waste waters containing sulfides are admixed with a hydrocarbonaceous fuel and reacted by partial oxidation with an oxygen-rich gas in a free-flow noncatalytic gas generator at an autogenous temperature in the range of about 1500 to 3500° F. and a pressure in the range of about 1 to 250 atmospheres to produce synthesis gas from which hydrogen sulfide may be subsequently recovered and converted into by-product sulfur.

BACKGROUND OF THE INVENTION

Field of the invention

This invention relates to a pollution abatement process wherein sulfide-bearing waste aqueous solutions are utilized without polluting the environment. More specifically it relates to the use of sour water, treated sour water, and other refinery waste waters in the production of synthesis gas.

Description of the prior art

Objectionable pollution of either the atmosphere or surface waters may be experienced upon disposing of sulfide-bearing waste aqueous solutions. For example the sulfur present as sulfides in such waste waters is noxious to plant life, and such waters are unsuitable as a source for domestic water.

Air, steam and other gases have been blown through waste-water solutions for purposes of stripping the obnoxious sulfides or to convert them to less objectionable thiosulfates. Such prior-art processes are generally unsatisfactory with respect to air-pollution abatement. Moreover, phenols do not respond to such prior art treatment. About 200 p.pm. or more of phenols may kill off the bacteria in BOD treatment plants such as trickle filters and activated sludge units.

SUMMARY

This is a continuous pollution abatement process for sulfide-bearing waste water e.g., sour water, treated sour water, and other refinery waste waters. A stream of waste water is introduced into the refractory-lined reaction zone of a free-flow noncatalytic synthesis gas generator in admixture with a hydrocarbonaceous fuel. By the partial oxidation reaction at an autogenous temperature in the range of about 1500 to 3000° F. and a pressure in the range of about 1 to 250 atmospheres, the aforesaid feed to the gas generator is reacted with an oxygen-rich gas to produce a hot effluent stream of synthesis gas substantially comprising a mixture of $H_2$, $CO$, $CO_2$ and $H_2O$ and containing a relatively minor amount of $H_2S$, $COS$, $A$, $N_2$, $CH_4$ and particulate carbon. The $H_2S$ in the aforesaid effluent synthesis gas may be recovered; also purified water may be separated from the effluent gas and used elsewhere in the process or discarded to the sewer.

In a second embodiment of the process the hot effluent synthesis gas from the gas generator is cooled and scrubbed with sulfide-bearing waste water. Particulate carbon is thereby removed from the effluent synthesis gas by the sour waste water. A waste water-particulate carbon dispersion is produced. The particulate carbon may adsorb any oil and phenol in the waste water. Any ammonia in the waste water may be used for pH control. For example, the ammonia may react with any formic acid produced in the quench zone. Simultaneously, the effluent synthesis gas strips the hydrogen sulfide from the sour quench water. The hydrogen sulfide going overhead with the effluent synthesis may be recovered downstream and converted into by-product sulfur.

It is therefore a principal object of the invention to provide a method for disposing of sour water and other refinery waste water without polluting the environment.

Another object of the invention is to provide a continuous economical process for utilizing sulfide-bearing waste aqueous solutions.

A still further object is to manufacture synthesis gas and to recover $H_2S$ from refinery waste water.

DESCRIPTION OF THE INVENTION

Sulfide-bearing aqueous waste liquors include by definition sour water, treated sour water, and other refinery waste waters. Such waste waters are essentially dilute solution of water having a pH of about 7 or above and which contain small amounts of $H_2S$, $NH_3$, hydrocarbons and other organic compounds.

For example, in the petroleum refining and petrochemical industries, steam is used as a stripping medium in distillation processes and as a diluent to reduce the hydrocarbon partial pressure in catalytic or thermal cracking. Eventually, the steam is condensed, and the aqueous effluent is commonly referred to as sour or foul water. Condensation of volatilized hydrocarbon liquids may occur simultaneously with the condensation of the steam. Waste water may be also found in distillation reflux drums for pressure and vacuum distillation of crude oil, petroleum coking, thermal and catalytic cracking, and hydrodesulfurization. Other sources of refinery waste water include tower clean-out water and water used for cooling and scrubbing hot process gas streams.

Ammonia is often present in treated sour water. For example, ammonia may have been injected into a fractionation overhead system to neutralize the $H_2S$ and to avoid the corrosion caused by acidic $H_2S$ in the sour condensate. Further, under certain conditions, ammonia may be synthesized within the gas generator. Ammonia and sulfur present as sulfide can each be present in an amount in the range from about 100 to 50,000 parts per million or even higher on a weight basis. All or part of the sulfide may be in the form of sulfide or hydrosulfide ion. The term ammonium sulfide as used in this specification is intended to include either or both $(NH_4)_2S$ and $NH_4HS$, as well as polysulfides, such as $(NH_4)_2S_4$. These compounds are readily converted into hydrogen sulfide and ammonia.

Typical chemical analyses for aqueous waste liquors are shown in Table I in parts per million weight basis (p.p.m.).

TABLE I

| | |
|---|---|
| Sulfide | 100–50,000 |
| $NH_4^+$ | 100–50,000 |
| Sulfite | 0–500 |
| Thiosulfate | 10–2,000 |
| Hydrocarbon, oil | 0–25,000 |
| Phenol | 0–10,000 |

The waste water may be supplied to the reaction zone of a free-flow synthesis gas generator in liquid or gaseous phase and in admixture with a hydrocarbonaceous feedstock or mixed with an oxygen-rich gas. The waste water will moderate the temperature in the reaction zone and may also react with a portion of the CO in the product gas and the hydrocarbonaceous fuel. The aforesaid impurities in the waste water may also undergo chemical change. From about 0.1 to 6 parts by weight of waste water are preferred per part by weight of hydrocarbonaceous fuel.

The synthesis-gas generator is free from catalyst, packing and other obstructions to the flow of the gases therethrough. It is a compact cylindrically shaped vertical steel pressure vessel whose inside walls are lined wtih refractory. An axially aligned flanged inlet port is located at the top of the vessel, and a flanged outlet port is located at the bottom. The various feedstreams may be introduced into the gas generator at ambient temperature, but preferably they are introduced at a temperature in the range of about 100° F. to 1000° F. Preferably, an annulus-type burner which is axially mounted in the top flanged port of the generator may be used for introducing and mixing the feedstreams. Suitably, an annulus-type burner, such as described in coassigned U.S. Pat. No. 2,928,460 isssued to Du Bois Eastman et al., may be employed.

Hydrocarbonaceous fuels which are suitable feedstocks for our process include by definition various petroleum distitllates and residua, naphtha, gas oil, residual fuel, reduced crude, whole crude, coal tar, coal oil, shale oil, and tar-sand oil. Included also are pumpable slurries of solid carbonaceous fuels e.g. coal, particulate carbon, and petroleum coke in waste water or in a liquid hydrocarbon fuel such as previously listed. Such slurries for example may have a solids content of about 1 to 60 weight percent in liquid hydrocarbon fuel and 25 to 55 weight percent in waste water.

Simultaneously, substantially pure oxygen (95 mole percent $O_2$ or more) at a temperature in the range of about ambient to 1000° F. is introduced into the reaction zone by means of the aforesaid burner. The amount of oxygen is controlled so as to prevent complete oxidation of the hydrocarbonaceous feed or the sulfides. Other oxygen-rich gases may be used, e.g., air and oxygen-enriched air (22 mole percent oxygen or more). However, nearly pure oxygen is preferred in order to avoid minor amounts of nitrogen and argon in the effluent gas. The atomic ratio of free (uncombined) oxygen to carbon in the feed (O/C ratio) is maintained in the range of about 0.60–1.2.

Oxygen is mixed with the hydrocarbonaceous feedstock and $H_2O$ in the reaction zone of the free-flow noncatalytic synthesis-gas generator. The mixture is reacted then at an autogenous temperature in the range of about 1500 to 3000° F. and at a pressure in the range of about 1 to 250 atmospheres. The reaction time in the gas generator is about 1 to 8 seconds.

The effluent product gas which is discharged from an axially aligned flanged outlet port located at the bottom of the gas generator comprises principally in mole percent $H_2$ 5.0 to 50, CO 1.0 to 50, $CO_2$ 5.0 to 25, $H_2O$ 10 to 75 and contains about .1 to 10 wt. percent of particulate carbon (basis wt. of carbon in feed). They may also be included in mole percent minor quantities of $H_2S$ .01 to 5.0 COS .001 to .10, N .1 to 1.5, $CH_4$ .05 to 25, and A .01 to 1.0.

The hot gaseous product stream from the reaction zone of the synthesis gas generator is quickly cooled below the reaction temperature to a temperature in the range of 300 to 700° F. For example, cooling of the effluent gas may be effected by immediately discharging the effluent gas into a quench tank, such as the type described in U.S. 2,896,-927, issued to R. E. Nagle et al. Further, during such quench cooling most of the unconverted particulate carbon in the hot effluent gaseous stream is simultaneously recovered as a particulate carbon dispersion in the quench water. Then, in a scrubbing zone, the cooled effluent product gas stream may be given an additional washing with water to remove any remaining particulate carbon. A gas-liquid contact apparatus such as a conventional venturi or jet scrubber may be used for this secondary scrubbing operation.

Alternately, the hot product gas stream from the reaction zone may be cooled to a temperature in the range of 300 to 700° F. by indirect heat exchange in a waste heat boiler with water. Steam produced in the waste heat boiler may be used elsewhere in the process. The entrained particulate carbon may be then scrubbed from the carrier gas by contacting the effluent stream of cooled product gas with water in a conventional gas-liquid contact apparatus, for example in a spray tower, venturi scrubber, bubble plate contactor, packed column, or in a combination of such equipment.

By cooling the effluent synthesis gas in the gas cooling and scrubbing zone below the dew point, clear purified waste water will condense out. It is important with respect to the economics of the process to separate clear water from the dispersion of particulate carbon and water that forms in the gas cooling and scrubbing zone. This separation may take place in a carbon recovery facility. The resulting clear water may be recycled to the gas cooling and scrubbing zone, or it may be used elsewhere in the process.

Th carbon recovery facility may be any conventional method for separating clear water from the water-particulate carbon dispersion comprising about 0.5 to 3 weight percent of solids. Suitable methods include gravity settling, centrifuge and filtration.

Another suitable carbon-recovery process comprises mixing the water-particulate carbon dispersion with a light hydrocarbon liquid fuel such as naphtha forming a light hydrocarbon liquid fuel-particulate carbon slurry and a clarified water phase. The clarified water phase is then separated from the light hydrocarbon liquid fuel-particulate carbon slurry in a decanter and recycled for use in quench cooling and scrubbing more effluent synthesis gas from the gas generator. Low cost fuel oil is then mixed with the light hydrocarbon liquid fuel-particulate carbon slurry and the mixture is introduced into a distillation column. In the distillation column, the light hydrocarbon liquid fuel is distilled off and reused to extract more carbon from the aforesaid water-particulate carbon dispersion. Hot fuel oil-particulate carbon slurry containing about 5 to 20 weight percent of carbon is removed from the bottom of the distillation column, optionally mixed with additional fuel oil, and introduced into said synthesis gas generator as feed.

The effluent stream of synthesis gas leaving the cooling and scrubbing zone substantially free from particulate carbon may be used as a source of feed gas for the synthesis of hydrocarbons or oxygen containing organic compounds. Alternately, the synthesis gas may be further processed to produce hydrogen. Unwanted constituents are removed and safely disposed of by conventional methods.

For example, $H_2S$, COS, $CO_2$ and $CH_4$ may be removed from the process gas stream in an acid-gas separation zone by a suitable conventional process involving refrigeration or refrigeration in combination with physical or chemical absorption with solvents, such as n-methylpyrrolidone, triethanolamine, propylene carbonate, or alternately with hot potassium carbonate. Most of the $CO_2$ absorbed in the solvent can be released by simple flashing, the rest being removed by stripping. This may be done most economically with impure nitrogen which may be made available free of cost if an air-separation uit is used to provide the oxygen for the gasification step. The resulting stream of $CO_2$ has a purity of more than 98.5% and may be used for organic synthesis. The regenerated solvent is then recycled to the absorption column for reuse. When necessary, final cleanup may be accomplished by passing the process gas through iron oxide, zinc oxide, or activated carbon to remove residual traces of $H_2S$ or organic sulfide.

Similarly $H_2S$ and COS-containing solvent is regenerated by further flashing and stripping with nitrogen. The $H_2S$ and COS may be then converted into sulfur by a suitable process. For example, the Claus process may be used to produce elemental sulfur from $H_2S$ as described in Kirk-Othmer Encyclopedia of Chemical Technology, Second edition, volume 19, John Wiley, 1969, page 352.

The synthesis gas may be further processed by methods well known in the art to produce hydrogen for use in hydrogenation reactions. In such case, the cooled and scrubbed synthesis gas may be first reacted with steam at a temperature in the range of about 750° F. to 1012° F. over a conventional water-gas shift catalyst e.g. 85 wt. percent of $Fe_2O_3$ and 15 wt. percent of $Cr_2O_3$ to convert the CO into $H_2$ and $CO_2$. When required, any additional carbon dioxide or other acid gas constituents may be removed by refrigeration or chemical absorption with hot potassium carbonate, alkanolamine solutions, or other absorption materials. Residual carbon monoxide may be removed by scrubbing the gas with an aqueous solution of cuprous ammonium chloride or by catalytic methanation. Further, pure liquid nitrogen may also be used to condense and separate argon, carbon monoxide and methane from the hydrogen stream.

In a second embodiment of my invention, sulfide-bearing waste water is also used for cooling and scrubbing the hot effluent synthesis gas from the gas generator. Such operations are carried out in a quench tank and gas-liquid contacting apparatus as previously described. The particulate carbon entrained in the effluent synthesis gas is recovered as a waste water-particulate carbon dispersion. The particulate carbon adsorbs any oil, hydrocarbons, phenol and other organic impurities in the sour waste water. The waste water-particulate carbon dispersion may be concentrated in the carbon-recovery zone producing clear water and a concentrated slurry as previously described. The slurry may be recycled to the gas generator as a portion of the feed. In this manner, substantially all of the particulate carbon produced by the process is consumed as fuel, and there is no net production of free-carbon. Further, the waste water is freed of organic impurities, which are converted to synthesis gas along with the particulate carbon. The high surface area of the particulate carbon may in some cases reduce the total organic content in the resulting clear water down to about 0 p.p.m.

Simultaneously, hydrogen sulfide may be stripped from sour water and carried out of the cooling and scrubbing zone by the effluent synthesis gas. About 0.4 to 2.4 s.c.f.h. of effluent synthesis gas at a temperature in the range of about 400 to 3000° F. and a pressure in the range 1 of 250 atmospheres is preferred per pound of waste water supplied to the cooling and scrubbing zone. In this manner the concentration of $H_2S$ in the waste water may be reduced to less than 1 p.p.m. Subsequently, the $H_2S$ in the effluent synthesis gas may be recovered and converted into by-product sulfur, as previously described. Ammonia remaining in the residual waste water helps to maintain the pH in the quench and scrubbing zone. For example, the ammonia will neutralize any formic acid produced in the system, preventing the corrosion of carbon steel piping and vessels.

DESCRIPTION OF THE PREFERRED EMBODIMENTS

The following examples are offered as a better understanding of the present invention, but the invention is not to be construed as limited thereto. All quantities are on an hourly basis.

EXAMPLE I

The effluent gas stream from a hydrocracking unit in a petroleum refinery is washed with water. The resulting waste water, also known as sour water, contains the following impurities in parts per million (p.p.m.) by weight: sulfide 4800, sulfite 40, thiosulfate, 1.0, $NH_3$ 3360, oil 904, and phenol 1315. The pH of the waste water is 9.0.

On a hourly basis, about 892 pounds of waste water are heated to a temperature of about 730° F. and mixed with about 219 pounds of fuel oil at a temperature of 225° F. to form a dispersion. The fuel oil has the following properties. API gravity 16°; viscosity, SSF/122° F. 119; heat of combustion 18,357 B.t.u./lb., and ultimate analysis wt. percent, C 84.96, H 11.54, S 2.05, N .50, O 1.12, ash 0.03.

By means of an annulus type burner, as previously described, the dispersion of waste water, and fuel oil is introduced into the closed compact refractory lined reaction zone of a vertical free flow synthesis gas generator in the absence of packing or catalyst. About 238.9 pounds of substantially pure oxygen (greater than 95% $O_2$ by volume) at a temperature of about 94° F. are passed through the burner and into the reaction zone of the gas generator. In the reaction zone, the oxygen is intimately mixed with the aforesaid dispersion of waste water and fuel oil and reaction by partial oxidation then takes place at an autogeneous temperature of about 1800° F. and at a pressure of about 1600 p.s.i.g.

The hot gaseous effluent stream from the reaction zone of the synthesis gas generator is quickly cooled below the reaction temperature, to about 575° F., by direct quenching in 5,723 pounds of water at a temperature of about 475° F. The quench water is contained in a closed quench vessel such as previously described. The turbulent condition in the quench chamber, caused by large volumes of effluent synthesis gas bubbling up through boiling quench water helps to scrub substantially all of the particulate solids from the effluent gas. About 6025 pounds of a dispersion comprising about 1.5 wt. percent of particulate carbon in quench water is removed from the bottom of the quench tank and sent to a carbon-recovery zone, as previously described. Clear water reclaimed in the carbon-recovery zone is recycled to the quench tank.

Vaporized quench water or steam passes out of quench vessel along with the effluent synthesis gas. When required, additional gas scrubbing may be effected by means of a conventional gas-liquid contact apparatus, for example a spray tower venturi or jet scrubber, bubble plate contactor, packed column, or in a combination of such equipment.

About 9,556 s.c.f.h. of effluent synthesis gas leaves the cooling and scrubing zone having the following analysis (dry basis-mole percent): $H_2$ 37.73, CO 12.86, $CO_2$ 32.73, $H_2S$ 1.03, COS .05, $CH_4$ 14.94, A .12, and N .50.

$CO_2$, $H_2S$ and other acid gas constituents may be removed by conventional refrigeration techniques, or by a combination of refrigeration and physical or chemical absorption with solvents, such as n-methyl pyrrolidone or an alkanolamine solution. The purified effluent stream of synthesis gas may be used as a source of feed gas for the synthesis of hydrocarbons or oxygen containing organic compounds. The $H_2S$ and COS-containing solvent may be regenerated by flashing and by stripping with nitrogen. The $H_2S$ and COS are then converted into by-product sulfur by a suitable process, as previously described.

EXAMPLE II

This example is similar to Example I but illustrates pollution abatement by disposing of sulfide-bearing waste water as feed to the gas generator and in the gas cooling and scrubbing zone downstream from the gas generator.

On a hourly basis, the feed dispersion to the synthesis gas generator described in Example I comprises as follows: 219 pounds of fuel oil having an API gravity of 16° as previously described, 831 pounds of refinery waste water as previously described, and 64 pounds of a water-particulate carbon slurry containing 4.76 wt. percent solids from the carbon-recovery zone. The feed dispersion at a temperature of 730° F. is intimately mixed with an oxygen-rich gas (95 vol. percent $O_2$) in the free-flow reaction zone and reacted at an autogenous temperature of about 1800° F. and at a pressure of about 1600 p.s.i.g.

The effluent synthesis gas from the reaction zone has the following composition on a mole percent wet basis: $H_2$ 13.77, CO 4.70, $CO_2$ 11.95, $H_2O$ 63.49, $H_2S$ .38, COS .02, $CH_4$ 5.46, N. 18, A .05. Entrained in the synthesis gas are about 1.5 wt. percent of particulate carbon (basis carbon in the feed).

About 5723 lbs. of the previously described refinery waste water are introduced into the quench vessel as described in Example I to cool the hot effluent synthesis gas to a temperature of 590° F. and to scrub out about 90% of said particulate carbon. The particulate carbon absorbs the oil, phenol, and other organic materials in the waste water and forms a dispersion with the waste water containing about 1 wt. percent of solids.

About 6025 lbs. of this dispersion is removed from the bottom of the quench vessel and sent to a carbon recovery zone. In the carbon recovery zone the dispersion is concentrated by filtration or sedimentation to a water-particulate carbon slurry containing 4.76 wt. percent solids, which is returned to the gas generator as a portion of the feed as previously described. The separated water may be used elsewhere in the process or discarded to a sewer.

The effluent synthesis gas leaves the quench tank carrying with it substantially all of the $H_2S$ stripped from the waste water quench. This gas stream is accelerated axially through a venturi mixer where it is intimately contacted at the throat with 1732 lbs. of the previously described refinery waste water at a temperature of about 475° F. By this means, the remainder of the particulate carbon is scrubbed from the effluent stream of synthesis gas and the $H_2S$ is stripped from the waste water. The gas-liquid mixture leaving the venturi scrubber is introduced into a separator. Effluent synthesis gas from the top of the separator contains 1.03 mole percent $H_2S$ (dry basis). The increase over the $H_2S$ in the effluent synthesis gas leaving the reaction zone e.g. 0.49 mole percent represents the $H_2S$ stripped from the refinery waste water used to cool and scrub the effluent synthesis gas. The effluent synthesis gas may be purified in the manner described previously in Example I. The water-particulate carbon dispersion from the bottom of the separator is sent to the carbon-recovery zone.

Obviously many modifications and variations of the invention as hereinbefore set forth may be made without departing from the spirit and scope thereof, and only such limitations should be imposed as are indicated in the appended claims.

We claim:

1. A pollution abatement process for waste waters including sour water, treated sour water and other refinery waste waters containing sulfides comprising
   (1) mixing together said waste waters and a hydrocarbonaceous fuel to produce a waste water-hydrocarbonaceous fuel mixture; and
   (2) reacting by partial oxidation the waste water-hydrocarbonaceous fuel mixture of (1) with an oxygen-rich gas in the reaction zone of a free-flow noncatalytic synthesis gas generator at an autogenous temperature in the range of about 1500 to 3500° F. and at a pressure in the range of about 1 to 250 atmospheres to produce an effluent stream of synthesis gas substantially comprising $H_2$, CO, $CO_2$, $H_2O$ and minor amounts of $H_2S$, $CH_4$, A, $N_2$, COS and particulate carbon.

2. The process of claim 1 wherein the weight ratio of waste water to carbonaceous fuel in the waste water-hydrocarbonaceous fuel mixture in step (1) is in the range of about 0.1 to 6, and the atomic ratio of free oxygen to carbon in said reaction zone is in the range of about 0.60 to 1.2.

3. The process of claim 1 further provided with the steps of
   (1) introducing the effluent stream of synthesis gas from step (2) into a gas cooling and scrubbing zone wherein said effluent gas stream is cooled and scrubbed substantially free from particulate carbon with sulfide-bearing waste water producing a dispersion of particulate carbon in waste water and wherein simultaneously substantially all of the sulfide in the form of $H_2S$ is stripped from said waste water by said effluent stream of synthesis gas;
   (2) separating the effluent stream of synthesis gas in (1) from said dispersion of particulate carbon in waste water in a gas-liquid separating zone; and
   (3) separating clear water substantially free from $H_2S$ from the dispersion from (2) in a carbon-recovery zone.

4. The process of claim 3 wherein about .4 to 2.4 standard cubic feet of effluent synthesis gas is scrubbed with each pound of waste water so that the $H_2S$ content in said waste water leaving said cooling and scrubbing zone is reduced to about 1 p.p.m. or lower.

5. The process of claim 3 wherein the clear water in step (3) is substantially free from organic impurities.

6. The process of claim 1 wherein said sulfide-bearing waste water is selected from the group consisting of sour water, treated sour water, and other waste water from petroleum refining and petrochemical industries.

7. The process of claim 3 further provided with the steps of mixing at least a portion of the dispersion of particulate carbon in waste water from said carbon-recovery zone with at least a portion of liquid hydrocarbon fuel to comprise the hydrocarbonaceous fuel which is introduced into the reaction zone of the synthesis gas generator.

8. The process of claim 3 further provided with the steps of processing the dispersion of particulate carbon in waste water in said carbon-recovery zone to produce a fuel oil-particulate carbon slurry, and recycling said slurry to the synthesis gas generator at at least a portion of said hydrocarbonaceous fuel.

9. A process for the abatement of pollution from sulfide-bearing refinery waste waters comprising
   (1) mixing together as feed to the reaction zone of a free-flow noncatalytic synthesis gas generator, a hydrocarbonaceous fuel and a slurry of particulate carbon produced subsequently in the process;
   (2) reacting by partial oxidation said feed in (1) with an oxygen-rich gas and $H_2O$ at an autogenous temperature in the range of about 1500 to 3500° F. and at a pressure in the range of about 1 to 250 atmospheres to produce an effluent stream of synthesis gas substantially comprising $H_2$, CO, $CO_2$, $HO_2$ and minor amounts of $H_2S$, $CH_4$, A, $N_2$ and particulate carbon;
   (3) introducing the effluent stream of synthesis gas from (2) into a gas cooling and scrubbing zone wherein said effluent gas stream is cooled and scrubbed substantially free from particulate carbon with said sulfide-bearing waste water producing a dispersion of particulate carbon in waste water and wherein simultaneously substantially all of the sulfide in the form of $H_2S$ is stripped from said waste water by said effluent stream of synthesis gas;

(4) separating the effluent stream of synthesis gas in (3) from said dispersion of particular carbon in waste water in a gas-liquid separating zone;

(5) separating clear water substantially free from $H_2S$ from the dispersion from (4) in a carbon-recovery zone, while producing the aforementioned slurry of particulate carbon in (1); and (6) recovering $H_2S$ from the effluent stream of synthesis gas leaving the separating zone in (4).

References Cited

UNITED STATES PATENTS

| | | | |
|---|---|---|---|
| 3,520,823 | 7/1970 | Slater | 252—373 |
| 3,591,449 | 7/1971 | Hess et al. | 210—63 X |

MICHAEL ROGERS, Primary Examiner

U.S. Cl. X.R.

48—212; 252—373

UNITED STATES PATENT OFFICE
CERTIFICATE OF CORRECTION

Patent No. 3,725,270      Dated April 3, 1973

Inventor(s) Joseph P. Tassoney and Roger M. Dille

It is certified that error appears in the above-identified patent and that said Letters Patent are hereby corrected as shown below:

Col. 3, line 39      "distitllates" should be --distillates--

Col. 3, line 74      insert a comma --,-- after "5.0"

Col. 5, line 7      "uit" should be --unit--

Signed and sealed this 25th day of December 1973.

(SEAL)
Attest:

EDWARD M. FLETCHER, JR.      RENE D. TEGTMEYER
Attesting Officer      Acting Commissioner of Patents